INVENTOR.
Keith H. Butler

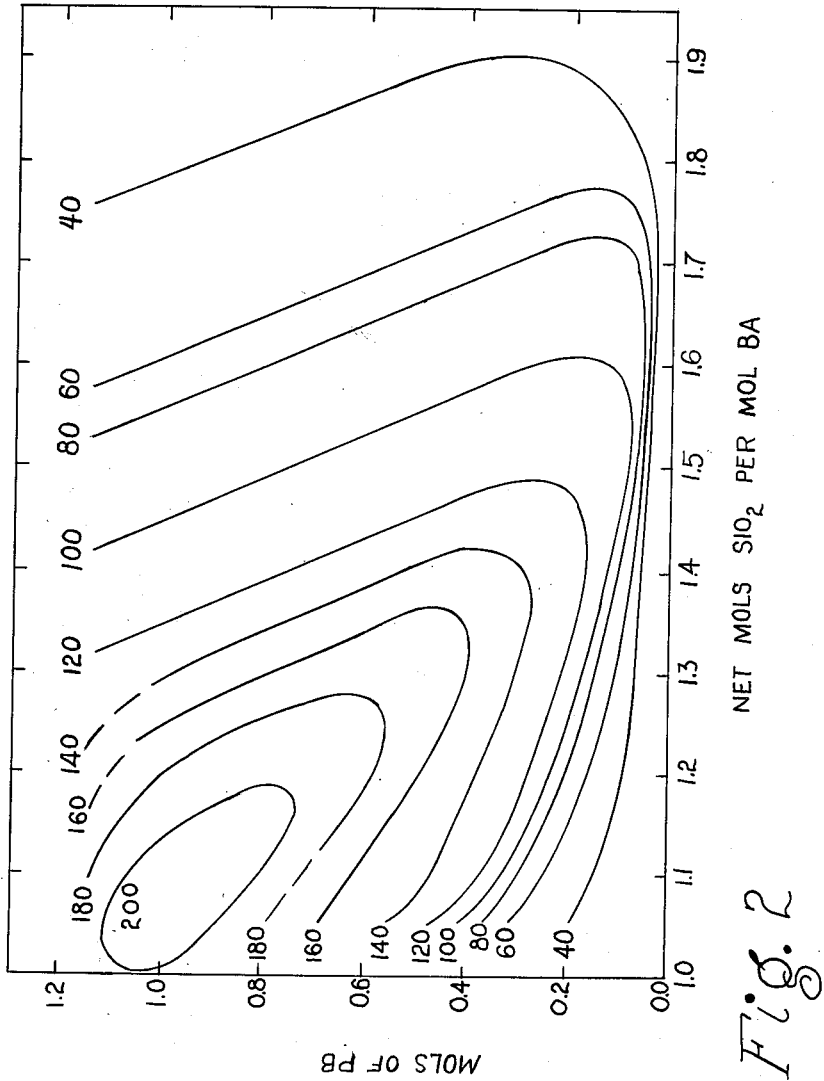

Patented Mar. 4, 1952

2,587,592

UNITED STATES PATENT OFFICE 2,587,592

BARIUM MESOTRISILICATE PHOSPHOR

Keith H. Butler, Marblehead, Mass., assignor to Sylvania Electric Products Inc., Salem, Mass., a corporation of Massachusetts Application February 1, 1947, Serial No. 725,779

1 Claim. (Cl. 252—301.4)

This invention relates to luminescent materials and more particularly to a barium silicate phosphor capable of excitation by short wavelength U. V. light.

An object of this invention is to provide a barium silicate phosphor adapted to be used in the preparation of a blue florescent lamp or as the blue component in fluorescent lamps of other colors.

A further object is to provide a phosphor for use in sign tubing.

I have discovered certain lead-activated barium silicate phosphors which emit blue and blue-green light when excited by 2537 Å. radiation. I have found that many of these phosphors may be employed advantageously in the field of fluorescent lighting and that they present certain advantages over some of the tungstate phosphors such as calcium lead tungstate which has been used heretofore in making fluorescent lamps. In the preparation of some of these lead-activated barium silicates, which are described more in detail below, I have found that the lead component, which acts as the activator, also modifies the color. Thus variations in the lead content enables one to obtain a variety of shades of color between blue and green without the necessity of blending two or more matrices. This feature is also advantageous because it provides an accurately controllable material which may be used as the blue-green component when blended with zinc beryllium silicates in the preparation of 3500° white, 4500° white and 6500° daylight lamps, for example. Another feature of the lead-activated barium silicate phosphors of my invention is that they provide more saturated colors than are obtainable from tungstate phosphors.

Further objects, advantages, and features will be apparent from the following specification in which:

Figure 2 is a contour diagram of green emission.

Figure 1:
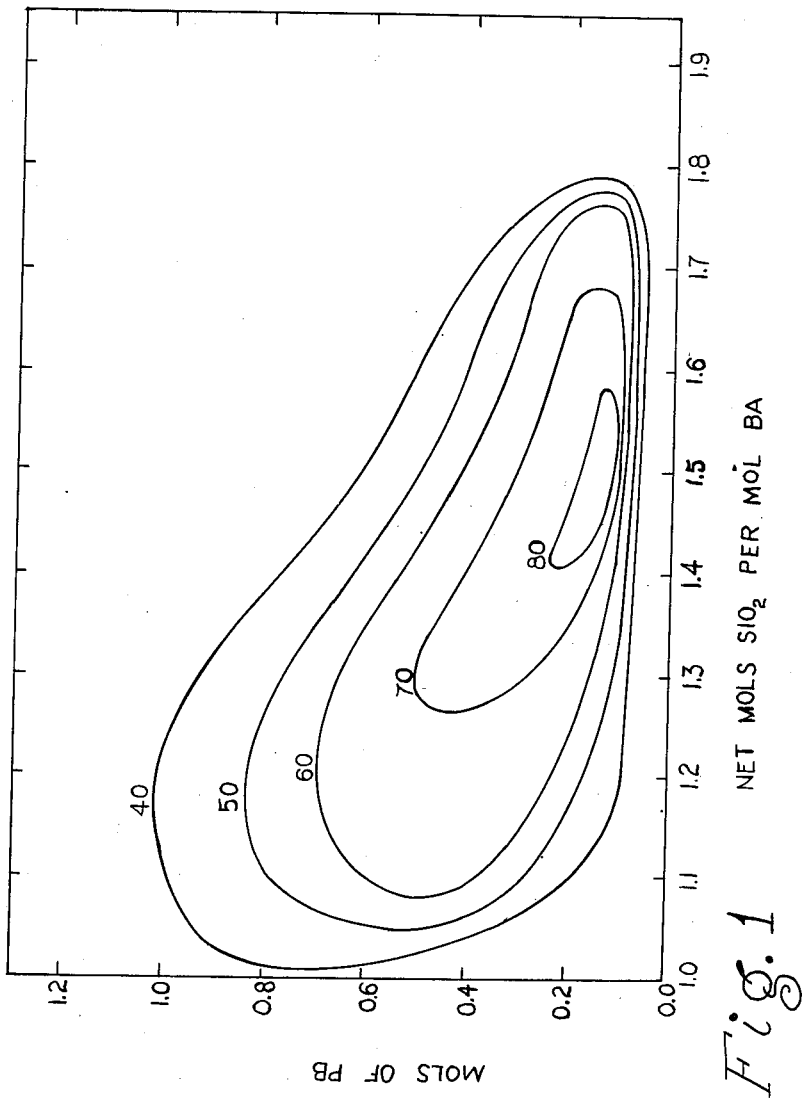
Figure 1 is a contour diagram of blue emission.

It is well known that barium silicates exist as four compounds of definite composition, namely, barium orthosilicate, barium metasilicate, barium mesotrisilicate, and barium disilicate. I have discovered that the metasilicate, the mesotrisilicate and the disilicate can be activated by lead so that, upon excitation by 2537 Å. radiation, they emit blue or blue-green light depending upon their composition. However, I have discovered that the orthosilicate cannot be activated by lead. I have also discovered certain double silicates of barium and lead which also fluoresce blue and blue-green. In contrast to other silicate phosphors, a very high concentration of activator can be employed.

I have found also that useful fluorescent materials can be made over a very wide range of composition; for example, the ratio of the lead to barium may vary from .01–1.30 and the ratio of silicic acid to barium may vary from 1.0 to 1.8, provided that additional silicic acid is used in sufficient quantity to form the metasilicate of the lead used. This variation has certain limitations which will be apparent from a study of Figures 1 and 2. For example, the combination of low lead content with low silicic acid content gives a poorly fluorescent material. The high lead contents should be combined with relatively low silicic acid content.

It has been my practice to determine the efficiency and the color of the flurescent light simultaneously, by illuminating the phosphor with light from a low pressure mercury arc in a quartz envelope, which light emits a large amount of 2537 Å. radiation. The fluorescent light emitted by the sample is measured by a Weston Photronic cell after passage through a suitable filter. As filters, I customarily employ Wratten tricolor gelatin filters cemented in glass. In this way I measure the blue, green and red components of the fluorescent light. Since this procedure gives only an arbitrary measurement I measure also a standard powder along with each sample and express the output of the sample as a percentage of this standard for each color. For testing the fluorescent materials described in this specification, calcium lead tungstate, such as is commonly employed in making blue fluorescent lamps, was selected as the standard.

The emission of red light is usually negligible so that these readings are not tabulated herein. For measurement of longwave U. V. light emitted, a Corning #5860 filter is employed in place of the Wratten Tricolor filter and the standard powder for comparison is a calcium cerium phosphate made according to the method described by Toorks 2,402,855. Measurements of the emission have been made on a large number of samples covering a wide range and results selected from these measurements are shown in Tables I and II below. In these tables the term "net $SiO_2$" refers to the number of mols of silicic acid per mol of barium, after subtracting one mol silicic acid for each mol of lead used in making the fluorescent material. From the measurement in these tables and others, Figures 1 and 2 have been drawn. These figures show as contour lines the emission, measured through the blue and green filters, as affected by composition. The visual effect of the emitted light when the phosphor is made into a lamp, of course, varies with the relative proportion of blue and green components and the efficiency in terms of L. P. W. also varies with the ratio of blue to green as well as with the output of fluorescent light. This effect is illustrated in Table III, for 20 watt fluorescent lamps.

TABLE III

| Mol Composition of Phosphor— | | | | Lumens per Watt | Visual Appearance |
|---|---|---|---|---|---|
| BaO | PbO | $SiO_2$ | | | |
| | | Total | Net | | |
| 1.0 | .02 | 1.22 | 1.20 | 4.9 | Violet. |
| 1.0 | .10 | 1.30 | 1.20 | 9.7 | Sky Blue. |
| 1.0 | .30 | 1.50 | 1.20 | 14.8 | Greenish Blue. |
| 1.0 | .60 | 1.80 | 1.20 | 31.3 | Blue Green. |
| 1.0 | .10 | 1.60 | 1.50 | 22.3 | Slightly greenish Blue. |

I have subjected a number of powders to X-ray examination and obtained powder diffraction photographs. Measurements of these show that 5 distinct patterns exist for barium silicates containing more silicic acid than is required to form a metasilicate. These are listed in Table IV and are designated as patterns A, B, C, D, and E.

TABLE IV

X-ray powder diffraction patterns—Estimated intensity and interplanar spacing—Substance

| A | | B | | C | | D | | E | |
|---|---|---|---|---|---|---|---|---|---|
| w | 3.677 | m | 3.69 | m | 3.745 | w | 5.25 | ww | 6.778 |
| ww | 3.539 | m | 3.38 | w | 3.648 | ww | 3.62 | ww | 5.076 |
| w | 3.408 | ww | 3.05 | w | 3.294 | w | 3.40 | m | 3.959 |
| w | 3.326 | w | 2.78 | w | 3.236 | ms | 3.33 | w | 3.795 |
| w | 3.103 | ww | 2.59 | w | 3.114 | w | 2.96 | ww | 3.729 |
| ww | 2.804 | ww | 2.47 | w | 2.770 | w | 2.74 | ww | 3.547 |
| ww | 2.735 | w | 2.27 | w | 2.347 | ww | 2.57 | w | 3.411 |
| ww | 2.694 | w | 2.22 | w | 2.265 | w | 2.19 | w | 3.326 |
| ww | 2.575 | ww | 2.12 | ww | 2.228 | w | 2.14 | w | 3.226 |
| w | 2.345 | w | 2.07 | w | 2.131 | ww | 2.09 | m | 3.082 |
| w | 2.290 | ww | 2.03 | ww | 2.082 | m | 2.04 | ww | 2.765 |
| w | 2.232 | ww | 1.90 | ww | 2.034 | w | 1.88 | w | 2.707 |
| ww | 2.186 | ww | 1.86 | ww | 1.973 | w | 1.82 | ww | 2.568 |
| ww | 2.129 | ww | 1.70 | ww | 1.915 | | | ww | 2.327 |
| w | 2.075 | ww | 1.55 | ww | 1.877 | | | w | 2.224 |
| w | 2.038 | ww | 1.39 | ww | 1.796 | | | ww | 2.191 |
| w | 1.892 | | | | | | | ww | 2.160 |
| ww | 1.847 | | | | | | | w | 2.122 |

Estimated intensity legend:
ww—very weak.
w—weak.
m—medium.
ms—medium strong.

TABLE I

Blue reading

| Mols PbO | Net Mols $SiO_2$ | | | | | | | |
|---|---|---|---|---|---|---|---|---|
| | 1.00 | 1.05 | 1.10 | 1.20 | 1.35 | 1.50 | 1.60 | 1.75 |
| .05 | | 15 | | 22 | 31 | 35 | | 40 |
| .10 | | 26 | | 45 | 59 | 80 | 76 | 60 |
| .20 | | | | 50 | | 75 | 70 | 61 |
| .30 | | | | 55 | | 68 | | |
| .40 | | | 42 | 65 | 60 | 75 | 56 | 56 | 31 |
| .50 | | | | | 64 | 64 | 49 | | |
| .60 | | | | 57 | 65 | 61 | 35 | | |
| .80 | | | 44 | 44 | 55 | 38 | 32 | | 30 |
| 1.00 | 31 | | | 38 | 40 | 33 | 26 | | 24 |
| 1.20 | | 30 | | | | | | |

TABLE II

Green reading

| Mols PbO | Net Mols $SiO_2$ | | | | | | | |
|---|---|---|---|---|---|---|---|---|
| | 1.00 | 1.05 | 1.10 | 1.20 | 1.35 | 1.50 | 1.60 | 1.75 |
| .05 | | 17 | | 25 | 38 | 40 | | 50 |
| .10 | | 22 | | 55 | 76 | 107 | 105 | 80 |
| .20 | | | | 70 | | 115 | 105 | 90 |
| .30 | | | | 100 | | 115 | | |
| .40 | | | 62 | 132 | 135 | 127 | 113 | 121 | 43 |
| .50 | | | | | 170 | 154 | 113 | | |
| .60 | | | | 158 | 195 | 168 | 103 | | |
| .80 | | | 203 | 211 | 197 | 154 | 93 | | 46 |
| 1.00 | 211 | | | 173 | 179 | 118 | 89 | | 41 |
| 1.20 | | 157 | | | | | | |

Pattern A is found for phosphors containing from 1.0 to 1.3 mols of silicic acid per mol of barium when the lead content is less than .05 mol of lead per mol of barium. It is identical with the pattern of non-fluorescent powder containing one mol of barium per mol of silicic acid and I believe it to be the pattern of barium metasilicate, $BaSiO_3$.

Pattern B is found in phosphors containing from .05 to .40 mol of lead per mol of barium, when the silicic acid content is 1.2 for each mol of barium, with, in addition, 1.0 mol of silicic acid for each mol of lead present.

Pattern C is found for phosphors containing from 0.01 to 0.60 mol of lead per mol of barium when the silicic acid is 1.5 mols per each mol of barium and 1.0 mol for each mol of lead. This pattern is identical with that of non-fluorescent powder containing 1.5 mols of silicic acid for each mol of barium and I believe it to be that of barium mesotrisilicate, $Ba_2Si_3O_8$. In the case of patterns B and C, a slight deviation from the specified silicic acid content has no obvious effect on the X-ray powder diffraction pattern.

Pattern D is found for phosphors containing 0.3 to 0.75 mol of lead per mol of barium when the silicic acid content is 1.2 mols per mol of barium, with additional silicic acid in the ratio of 1.0 mol per mol of lead being also present. It is also found for phosphors containing .12 to .6 mol of lead per mol of barium, when the silicic acid content is 1.0 mol for each mol of lead plus 1.5 mols for each mol of barium present. The relative proportions of these four compounds in various prosphors prepared according to the method of this invention are shown in Table V.

TABLE V

| Mol Composition of Phosphor | | | | Relative Intensity of X-ray Powder—Diffraction Pattern | | | |
|---|---|---|---|---|---|---|---|
| BaO | PbO | SiO$_2$ | | A | B | C | D |
| | | Total | Net | | | | |
| 1.0 | .02 | 1.22 | 1.2 | S | — | — | — |
| 1.0 | .10 | 1.30 | 1.2 | — | S | — | — |
| 1.0 | .30 | 1.50 | 1.2 | — | W | — | M |
| 1.0 | .50 | 1.70 | 1.2 | — | WW | — | S |
| 1.0 | .75 | 1.95 | 1.2 | — | — | — | S |
| 1.0 | .04 | 1.54 | 1.5 | — | — | S | — |
| 1.0 | .12 | 1.62 | 1.5 | — | — | S | WW |
| 1.0 | .30 | 1.80 | 1.5 | — | — | SM | M |
| 1.0 | .50 | 2.00 | 1.5 | — | — | W | MS |
| 1.0 | .60 | 2.10 | 1.5 | — | — | W | MS |

Relative intensity legend:
S—strong.
MS—medium strong.
M—medium.
W—weak.
WW—very weak.
(—)—not present.

Pattern E is found in the case of powders containing above about 1.55 mols of silicic acid per mol of barium with lead contents of the order of .02 mol.

When the silicic acid is intermediate between 1.2 and 1.5 net mols per mol of barium, X-ray powder diffration patterns show the presence of compounds giving patterns A and C or B and C, or B and D indicating that mixtures exist. When the silicic acid is intermediate between about 1.55 and 2.0 net mols per mol of barium, patterns C and E are both found and the powder shows some longwave U. V. emission indicating definitely the presence of barium disilicate. However, this mixture emits blue or blue-green visible light and has therefore some new and useful properties making it distinct from the pure barium disilicate phosphor prepared with more than 2.0 mols of silicic acid per mol of barium.

In the preparation of phosphors, it has been my custom to use 1 mol of silicic acid for each mol of lead present and to express the difference between the total mols of silicic acid and the amount used to form the lead metasilicate as the "net SiO$_2$" which is free to combine with the barium to form a barium silicate. I prefer to use the following method of preparation, though other methods known to those skilled in the art may be employed without departing from the spirit of my invention. Sufficient quantities of silicic acid, of barium carbonate and of lead carbonate to make the desired composition are wet milled in water using ball mills containing flint pebbles for 2 to 16 hours. After milling, the mixture is filtered and the cake dried, crushed or dry ground, and fired in silica vessels for about 4 hours at a suitable temperature. The firing temperature required depends to a considerable extent on the composition of the phosphor and may vary from 1600 to 2100° F. In general, the metasilicate phosphors require higher firing temperatures than the mesotrisilicate phosphors. Also, with increasing lead content the firing temperature must be lowered considerably.

I have found it advantageous to employ a catalyst such as barium fluoride in amount from .02 to .50% by weight based on the total weight of the raw materials used. The function of this catalyst is to accelerate the reaction between the raw materials and permit firing at a lower temperature. This reduction in firing temperature results in a reduction in particle size of the fluorescent powder. However, such a catalyst is not essential to the preparation of the phosphors and may be omitted if desired.

As an example of my invention, I prepared a phosphor by wet milling together 400 grams of barium carbonate, 60 grams of lead carbonate, 230 grams of silicic acid containing about 88% SiO$_2$ and 4 grams of barium fluoride. This mixture was ground in a 1 gallon porcelain jar mill with flint pebbles for about 8 hours using 1800 cc. of water as the suspending agent. The resulting suspension was filtered, dried, and crushed. It was then charged into silica vessels and fired for 4 hours at a temperature of 1880° F. after which it was removed from the furnace and allowed to cool in the air. The resulting powder was removed from the crucible, crushed to pass a 40 mesh sieve, and the output of fluorescent light measured as specified above. This powder had an output measured through the blue filter of 86% of the output of calcium lead tungstate and measured 134% through the green filter.

As a further example, I ground, in a quart mill with flint pebbles using about 100 cc. of water as a suspending agent, a mixture of about 49 grams of barium carbonate, 40 grams of lead carbonate, 27½ grams of silicic acid containing about 91% SiO$_2$ and 0.4 gram of barium fluoride. After milling for 2 hours, the suspension was filtered, dried and the cake crushed. It was then fired in silica vessels for 4 hours at a temperature of 1780° F. The resulting powder had a blue emission of 57% and a green emission of 158%, as compared to the output of calcium lead tungstate.

As a still further example, I have prepared a raw material blend by grinding together in a 4 gallon pebble mill, with 4.6 liters of water as a suspending agent, about 1600 grams of barium carbonate, 352 grams of lead carbonate, 16 grams of barium fluoride, and 800 grams of silicic acid containing about 90% SiO$_2$. This charge was removed from the mill after 6 hours grinding and was filtered, dried, and dry ground through a hammermill. It was then fired for 4 hours at a temperature of 1880° F. This powder had an output in the blue of 101% and in the green of 110% of the output of calcium lead tungstate.

As was mentioned above, the lead-activated barium silicate phosphors of my invention may be used advantageously as the blue-green component when blended with zinc beryllium silicates in the preparation of 3500° white, 4500° white and 6500° daylight fluorescent lamps. In the preparation of the powders for a 3500° white, for example, I have blended 36 grams of lead-activated barium silicate with 164 grams of manganese-activated zinc beryllium silicate. In preparing the barium silicate I use about 1 mol barium oxide, about 0.1 mol lead oxide and a total of about 1.6 mols of silicic acid. In preparing the zinc beryllium silicate I use about 0.9 mol of zinc oxide, about 0.1 mol of beryllium oxide, about 0.58 mol of silicic acid, and about 0.05 mol of manganese. The barium silicate was processed in a manner similar to that described in the examples above. When this material was used in a 20 watt fluorescent lamp, the color was a visual match for a standard 3500° white fluorescent lamp, and the lamp had an output of 48 lumens per watt at 100 hours and 43.6 lumens per watt at 1750 hours.

The presence of chlorides, particularly alkali chlorides, in appreciable amounts, should be avoided for good lumen maintenance.

What I claim is:

A blue-fluorescing luminescent material consisting essentially of barium lead silicate having about 1.5 net mols of $SiO_2$ per mol of Ba and about 0.12 mol of Pb per mol of Ba.

KEITH H. BUTLER.

REFERENCES CITED

The following references are of record in the file of this patent:

UNITED STATES PATENTS

| Number | Name | Date |
|---|---|---|
| 2,299,510 | Steadman | Oct. 20, 1942 |

FOREIGN PATENTS

| Number | Country | Date |
|---|---|---|
| 119,671 | Australia | Mar. 5, 1945 |
| 572,771 | Great Britain | Oct. 23, 1945 |